Figure 1:
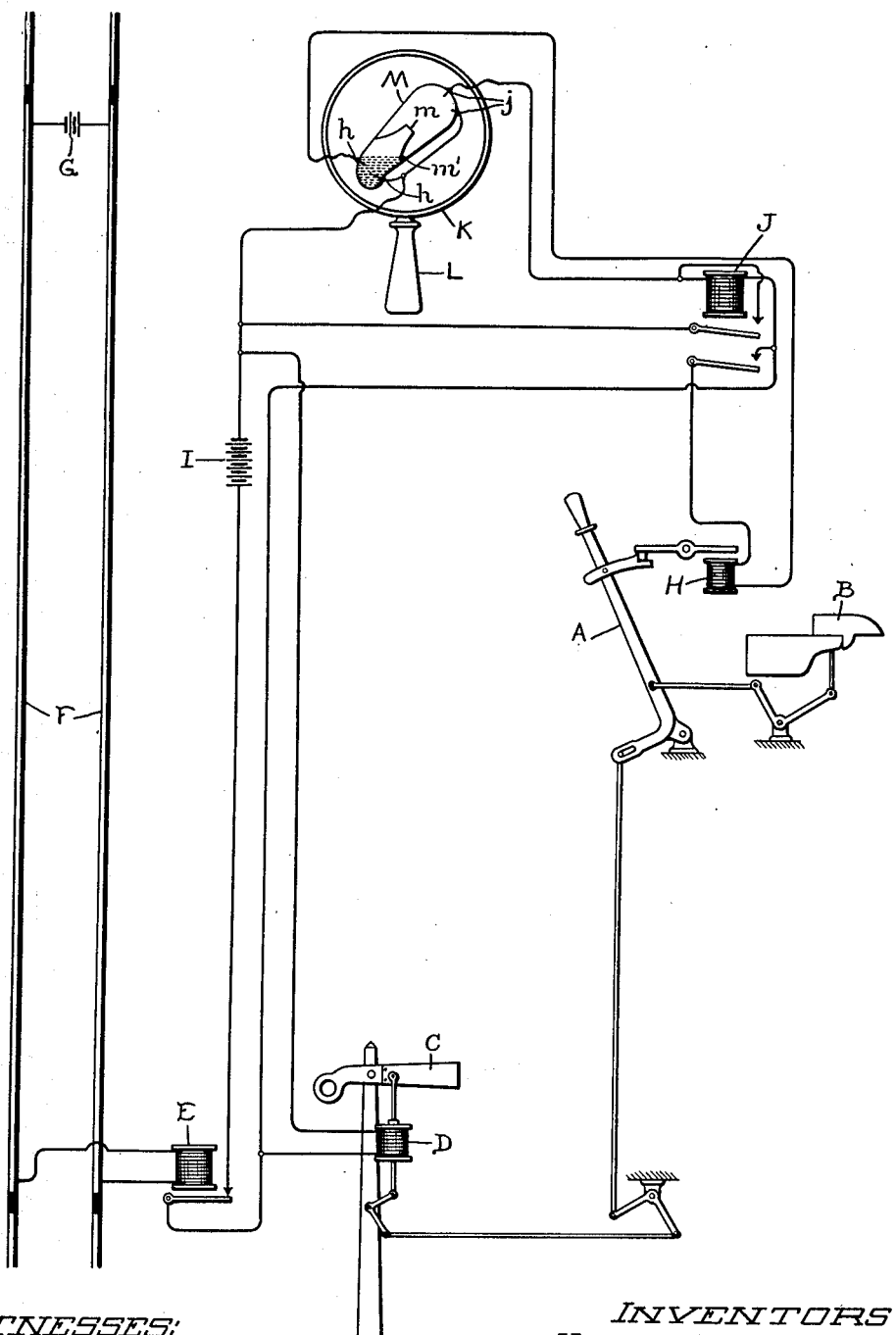

No. 892,637. PATENTED JULY 7, 1908.
H. C. WILLIAMS & F. B. HARRINGTON.
CONTROLLING MEANS FOR RAILWAY APPARATUS.
APPLICATION FILED MAR. 25, 1908.

2 SHEETS—SHEET 1.

WITNESSES:
Lester H. Fulmer
J. Ellis Glen

INVENTORS
HIRAM C. WILLIAMS.
FRANCIS B. HARRINGTON.
BY Albert H. Davis
ATT'Y.

No. 892,637. PATENTED JULY 7, 1908.
H. C. WILLIAMS & F. B. HARRINGTON.
CONTROLLING MEANS FOR RAILWAY APPARATUS.
APPLICATION FILED MAR. 25, 1908.

2 SHEETS—SHEET 2.

WITNESSES:
Lester H. Fulmer
J. Ellis Glen

INVENTORS
HIRAM C. WILLIAMS.
FRANCIS B. HARRINGTON.
BY
ATT'Y.

UNITED STATES PATENT OFFICE.

HIRAM C. WILLIAMS, OF UTICA, AND FRANCIS B. HARRINGTON, OF ALBANY, NEW YORK, ASSIGNORS TO GENERAL ELECTRIC COMPANY, A CORPORATION OF NEW YORK.

CONTROLLING MEANS FOR RAILWAY APPARATUS.

No. 892,637.            Specification of Letters Patent.            Patented July 7, 1908.

Application filed March 25, 1908. Serial No. 423,168.

*To all whom it may concern:*

Be it known that we, HIRAM C. WILLIAMS and FRANCIS B. HARRINGTON, citizens of the United States, residing, respectively, at Utica, county of Oneida, State of New York, and at Albany, county of Albany, State of New York, have invented certain new and useful Improvements in Controlling Means for Railway Apparatus, of which the following is a specification.

Our invention relates to controlling means for railway apparatus.

In connection with the control levers on interlocking machines it has been customary heretofore, in certain cases, to employ what is known as a screw-release or low-speed circuit-closer for the purpose of preventing the closing of the circuit of a lock-magnet for a predetermined time after it has once been broken. For this purpose, heretofore, contacts have been employed, driven by a hand-wheel through a worm-gear, so that the movement of the contacts is very slow. This arrangement is, to a certain extent, objectionable, since, during the interval while the circuit-closer is being operated, it requires the attention of the operator.

Our invention consists in a novel arrangement of the control-apparatus whereby the desired time-interval is obtained, but which does not require the attention of the operator during this time-interval.

Our invention consists in employing in combination with the lock-magnet of a lever, a "stick-relay" (that is, a relay provided with contacts arranged to close a maintaining-circuit for itself) controlling the lock-magnet, and a time-element circuit-closer controlling both "stick-relay" and lock-magnet; the circuit-closer being so arranged that it may be shifted quickly by the operator, but will not close the circuit until after the desired interval. For this purpose we employ a mercury circuit-closer similar in construction to that described in a different combination in a former application, Serial No. 400,646, filed Nov. 4, 1907. This circuit-closer comprises a vessel having two chambers separated by a dividing wall arranged to permit a slow flow of mercury from one chamber to the other. By properly proportioning the amount of the mercury to the size of the opening connecting the two chambers, the time-interval may be made anything desired within reasonable limits.

Figure 2:
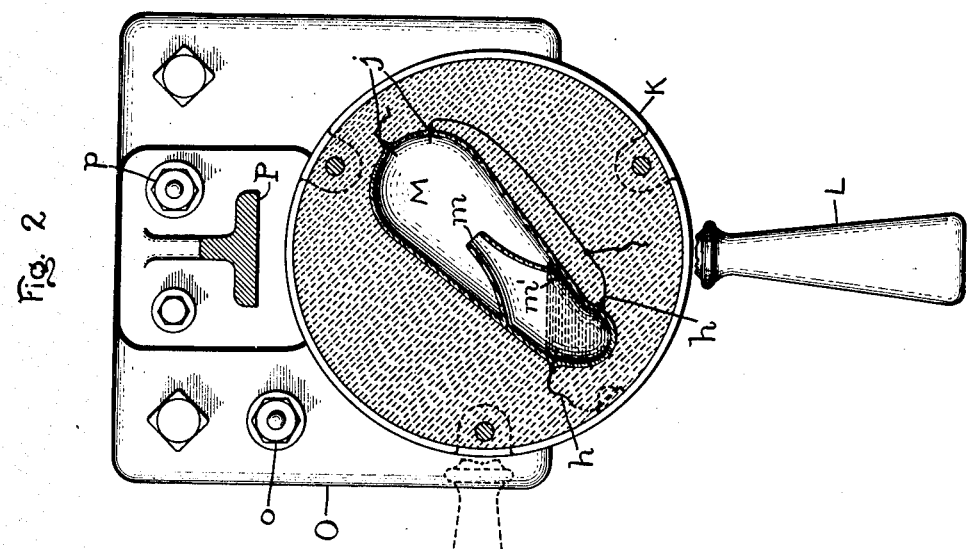

Our invention will best be understood by reference to the accompanying drawings, in which Figure 1 shows diagrammatically a signal controlling lever and lock-magnet provided with a time-element circuit-closer arranged in accordance with our invention; Fig. 2 shows a cross-sectional front elevation of the circuit-closer; and Fig. 3 a side elevation of the same.

In Fig. 1, A represents a lever of an interlocking machine, indicated diagrammatically at B, which lever controls through suitable connecting means a signal C. D represents diagrammatically the slot-mechanism for the signal. E is a track-relay controlling the slot-mechanism D and connected to the rails F of a track-section supplied with current from a battery G. H represents a lock-magnet for the lever A, which permits the movement of the lever to clear the signal only when the lock-magnet is energized. I represents a source of current for the slot-mechanism D and lock-magnet H. J represents a "stick-relay," or in other words, a relay provided with contacts for closing a maintaining circuit for itself. K represents the time-element circuit-closer, which is pivotally mounted and provided with a suitable actuating member or operating-handle L. Within the casing of the circuit-closer is a glass vessel M, which contains mercury and is separated into two chambers by a dividing wall having two openings connecting the chambers,—one opening $m$ being large, and the other $m'$ being restricted. These openings are so arranged that when the circuit-closer is rotated ninety degrees in a clockwise direction, as viewed in Fig. 1, the mercury passes quickly from the left-hand to the right-hand chamber through the opening $m$, but when the circuit-closer is returned to the position shown in the drawing, the mercury is compelled to flow back through the restricted opening m', so that a certain time is required for its return to the left-hand chamber. Within the left-hand chamber is a pair of contacts h in circuit with the lock-magnet H, and in the right-hand chamber is a pair of contacts j in circuit with the "stick-relay" J.

As shown in Fig. 1, the track section F is unoccupied, so that the relay E is energized, closing the circuit of the slot mechanism. The circuit of lock-magnet H is, however, open at the lower contacts of "stick-relay" J, so that the lever A cannot be moved to clear the signal C. If, however, the circuit-closer K is moved ninety degrees in a clockwise direction, the mercury passes into the right-hand chamber of the vessel M and bridges contacts j so as to close a circuit from the upper terminal of battery I through contacts j, winding of "stick-relay" J, and contacts of track-relay E, to the lower terminal of battery I. "Stick-relay" J is consequently energized and closes its contacts. Its upper contact closes a maintaining circuit for itself in parallel with the contacts j. Lock-magnet H, however, is still deënergized, since its circuit is open at contacts h of the circuit-closer. When the circuit-closer is returned to the position shown in the drawing, the mercury flows back slowly through the restricted opening m' into the left-hand chamber, and when nearly all the mercury has returned to the left-hand chamber, contacts h are bridged by it, and the circuit of lock-magnet H is completed, so that the lever A may be thrown to clear signal C. When a train admitted by signal C to track-section F has entered the track-section, track-relay E is deënergized so as to deënergize slot-mechanism D and throw signal C to danger. It also deënergizes "stick-relay" J and lock-magnet H. Signal C cannot again be cleared until track-relay E is again energized, so as to energize slot-mechanism D, lever A has been thrown back to the position shown in Fig. 1, so as to lock up with the signal through the slot-mechanism, and the circuit-controller has been thrown so as to energize "stick-relay" J again, and has been again returned to its normal position.

By the arrangement of apparatus described above, a predetermined interval is obtained between the time when locking magnet H is deënergized and the time when it can again be energized, while, except for the moment required to shift the circuit-closer K to its other position and back again, the operator's attention is not required by the circuit-closer, so that he is left free to attend to other matters.

Figure 3:
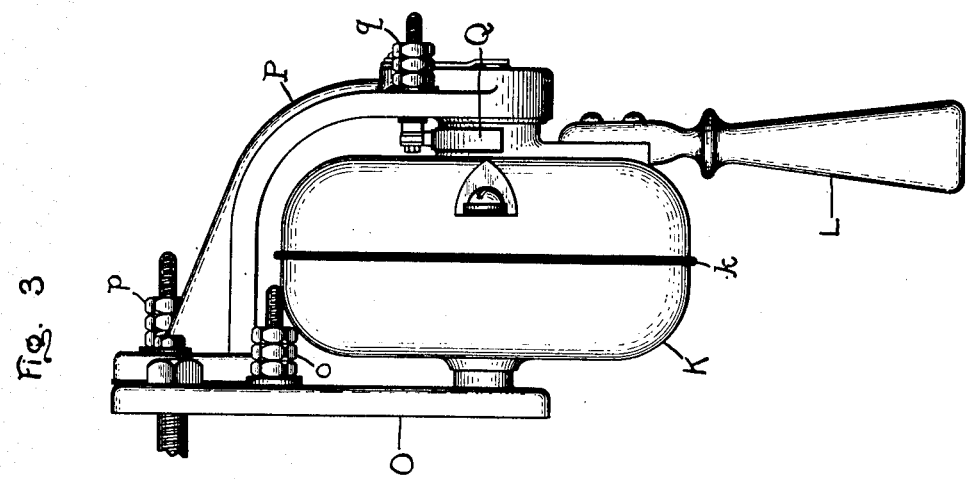

A suitable construction of the circuit-closer is shown in Figs. 2 and 3. The vessel M is embedded in cement within the casing K, which casing is formed in two parts insulated from each other by a ring k of insulating material. Casing K is pivotally mounted between a base O and a bracket-arm P, which is secured to but insulated from the base O. One terminal h is electrically connected to the portion of the casing next to the base O, and through the casing is an electrical connection with the base, which is provided with a binding-post o. One terminal j may be connected to the front half of the casing K, and through this part of the casing to the insulated bracket-arm P, which is provided with a suitable binding-post p. The remaining terminals h and j may be connected together and to an insulated contact Q, on which bears a brush carried by a binding-post q. Thus, by means of the three binding-posts o, p and q, the connections of the several contacts are made without requiring flexible leads.

The circuit-closer is shown in its normal position in Figs. 2 and 3. When the circuit-closer is moved to its other position the handle occupies the position shown in dotted lines in Fig. 2. The weight of the handle may serve as a counter-weight to return the circuit-closer to normal position as soon as the handle is released by the operator. It is, therefore, only necessary for the operator to shift the handle to the dotted-line position and hold it there for the instant required for the mercury in the vessel M to flow through the large opening m from the left-hand chamber to the right. The handle may then be immediately released, but the circuit is not closed at the contacts h until after the interval predetermined by the size of the opening m'.

We do not desire to limit ourselves to the particular construction and arrangement of parts here shown, but aim in the appended claims to cover all modifications which are within the scope of our invention.

What we claim as new and desire to secure by Letters Patent of the United States, is,—

1. In combination with a control-lever for railway apparatus, a magnet controlling the movement of said lever, a time-element circuit-closer controlling said magnet, an actuating member therefor, said circuit-closer being arranged to close its circuit only at a predetermined interval after said actuating member has completed its movement, and a "stick-relay" controlling said magnet jointly with said circuit-closer.

2. In combination with a control-lever for railway apparatus, a magnet controlling the movement of said lever, a time-element circuit-closer controlling said magnet, an actuating member therefor, said circuit-closer being arranged to close its circuit only at a predetermined interval after said actuating member has completed its movement, and a "stick-relay" controlled by said circuit-closer and jointly therewith controlling said magnet.

3. In combination with a control-lever for railway apparatus, a magnet controlling the movement of said lever, a circuit-closer controlling said magnet comprising a movable vessel having two chambers, a pair of contacts in one of said chambers, a conducting fluid within the vessel, and a dividing wall between the chambers arranged to permit a slow flow of fluid from one chamber to the other, and a "stick-relay" controlling said magnet jointly with said circuit-closer.

4. In combination with a control-lever for railway apparatus, a magnet controlling the movement of said lever, a "stick-relay" controlling said magnet, a circuit-closer comprising a movable vessel having two chambers, a conducting fluid in said vessel, a dividing wall between said chambers arranged to permit a slow flow of fluid from one chamber to the other, and a pair of contacts in each chamber, one pair in circuit with said magnet and the other with said "stick-relay."

5. In combination with a control-lever for railway apparatus, a magnet controlling the movement of said lever, a "stick-relay" controlling said magnet, a circuit-closer comprising a movable vessel having two chambers, a conducting fluid in said vessel, a dividing wall between said chambers arranged to permit a slow flow of fluid from one chamber to the other and a rapid flow of fluid from the second chamber to the first, and a pair of contacts in each chamber, one pair in circuit with said magnet and the other with said "stick-relay."

6. In combination with a control-lever for railway apparatus, a magnet controlling the movement of said lever, a time-element circuit-closer controlling said magnet, an actuating member therefor, said circuit-closer being arranged to close its circuit only at a predetermined interval after said actuating member has completed its movement, a "stick-relay" controlled by said circuit-closer and jointly therewith controlling said magnet, and means controlled by train movements for deënergizing the "stick-relay."

7. In combination with a control-lever for railway apparatus, a magnet controlling the movement of said lever, a "stick-relay" controlling said magnet, a circuit-closer comprising a movable vessel having two chambers, a conducting fluid in said vessel, a dividing wall between said chambers arranged to permit a slow flow of fluid from one chamber to the other, and a pair of contacts in each chamber, one pair in circuit with said magnet and the other with said "stick-relay," and means controlled by train movements for deënergizing the "stick-relay."

8. In combination with a control-lever for railway apparatus, a magnet controlling the movement of said lever, a circuit-closer controlling said magnet comprising a movable vessel having two chambers, a pair of contacts in one of said chambers, a conducting fluid within the vessel, and a dividing wall between the chambers arranged to permit a slow flow of fluid from one chamber to the other, and a "stick-relay" controlled by said circuit-closer and jointly therewith controlling said magnet.

9. In combination with a control-lever for railway apparatus, a magnet controlling the movement of said lever, a circuit-closer controlling said magnet comprising a movable vessel having two chambers, a pair of contacts in one of said chambers, a conducting fluid within the vessel, and a dividing wall between the chambers arranged to permit a slow flow of fluid from one chamber to the other, a "stick-relay" controlled by said circuit-closer and jointly therewith controlling said magnet, and means controlled by train movements for deënergizing said "stick-relay."

10. In combination with a control-lever for railway apparatus, a magnet controlling the movement of said lever, a "stick-relay" controlling said magnet, and a reciprocating circuit-closer having contacts arranged to close the circuit of the "stick-relay" upon the movement of said circuit-closer to one position and contacts arranged to close the circuit of said magnet at a predetermined interval after the return of said circuit-closer to its other position.

11. In combination with a control-lever for railway apparatus, a magnet controlling the movement of said lever, a "stick-relay" controlling said magnet, a reciprocating circuit-closer having contacts arranged to close the circuit of the "stick-relay" upon the movement of said circuit-closer to one position and contacts arranged to close the circuit of said magnet at a predetermined interval after the return of said circuit-closer to its other position, and means controlled by train movements for deënergizing said "stick-relay."

12. In combination with a control-lever for railway apparatus, a magnet controlling the movement of said lever, a "stick-relay" controlling said magnet, and a reciprocating circuit-closer arranged in its two positions to close the circuits of said "stick-relay" and of said magnet respectively but to close at least one of said circuits only at a predetermined interval after the circuit-closer has completed its movement to that position.

13. In combination with a control-lever for railway apparatus, a magnet controlling the movement of said lever, a "stick-relay" controlling said magnet, a reciprocating circuit-closer arranged in its two positions to close the circuits of said "stick-relay" and of said magnet respectively but to close at least one of said circuits only at a predetermined interval after the circuit-closer has completed its movement to that position, and means controlled by train movements for deënergizing the "stick-relay."

In witness whereof, we have hereunto respectively set our hands this 16th & 20th days of March, 1908.

HIRAM C. WILLIAMS.
FRANCIS B. HARRINGTON.

Witnesses as to Hiram C. Williams:
F. W. COOPER,
M. R. GARLOCK,
S. ELIZABETH CEUES.

Witnesses as to signature of F. B. Harrington:
A. H. WRIGHT,
T. E. WILLIAMSON.